United States Patent [19]

Eriksson

[11] Patent Number: 4,983,280
[45] Date of Patent: Jan. 8, 1991

[54] SCREENING APPARATUS

[75] Inventor: Jan E. Eriksson, Uppsala, Sweden

[73] Assignee: Powerscreen International Limited, County Tyrone, United Kingdom

[21] Appl. No.: 333,766

[22] Filed: Apr. 5, 1989

Related U.S. Application Data

[63] Continuation of Ser. No. 196,773, May 17, 1988, abandoned, which is a continuation of Ser. No. 73,849, Jul. 14, 1987, abandoned, which is a continuation of Ser. No. 842,274 filed as PCT GB85/00062 on Feb. 15, 1985, published as WO85/03652 on Aug. 29, 1985, abandoned.

Foreign Application Priority Data

Feb. 15, 1984 [GB] United Kingdom ............... 8403958

[51] Int. Cl.⁵ ..................... B07B 1/00; B07B 1/46
[52] U.S. Cl. ..................... 209/241; 209/247; 209/257; 209/355; 209/420
[58] Field of Search ............ 209/240, 241, 243, 247, 209/255, 257, 352, 353, 355, 409, 412, 413, 420, 421, 935; 198/313, 314, 316.1

[56] References Cited

U.S. PATENT DOCUMENTS

| | | | |
|---|---|---|---|
| 1,661,781 | 3/1928 | Whitnall | 209/247 |
| 1,840,029 | 1/1932 | Garbe | 209/247 X |
| 2,022,146 | 11/1935 | Ossing | 209/247 X |
| 2,922,510 | 1/1960 | Zetterlund | 209/241 X |
| 3,235,078 | 2/1966 | Hostetler | 209/421 X |
| 3,884,346 | 5/1975 | O'Neill et al. | 198/589 |
| 4,058,198 | 11/1977 | O'Neill et al. | 198/314 X |
| 4,190,526 | 2/1980 | Bachand | 209/421 X |
| 4,303,506 | 12/1981 | Finlay | 209/247 |
| 4,591,432 | 5/1986 | Hartl | 209/247 |
| 4,879,023 | 11/1989 | Mallaghan | 209/241 |

FOREIGN PATENT DOCUMENTS

| | | | |
|---|---|---|---|
| 0019434 | 11/1980 | European Pat. Off. | |
| 2316005 | 1/1977 | France | |
| 2332682 | 6/1977 | France | |
| 1266337 | 3/1972 | United Kingdom | |
| 1449001 | 9/1976 | United Kingdom | 209/247 |
| 1480688 | 7/1977 | United Kingdom | |

Primary Examiner—Johnny D. Cherry
Assistant Examiner—Edward M. Wacyra
Attorney, Agent, or Firm—Dickstein, Shapiro & Morin

[57] ABSTRACT

Screening apparatus comprises a feeder conveyor, an elevator, a screen box, an end boom elevator and two lateral boom elevators all carried on a wheeled trailer. The elevator has an elongated support with an endless belt arranged around two rollers longitudinally spaced apart on the support. A superstructure framework on the trailer carries the support in a plurality of inclined positions, and the screen box is pivotally linked to the end of the support corresponding to the discharge end of the belt and hinged to the structure at the opposite end. The support extends and retracts along its lengths by means of hydraulic rams and thereby pivots the screen. The screen box also has hydraulic rams and cylinders to adjust the angle of inclination of the screen relative to the support and thereby also adjust the inclination of the support.

124 Claims, 4 Drawing Sheets

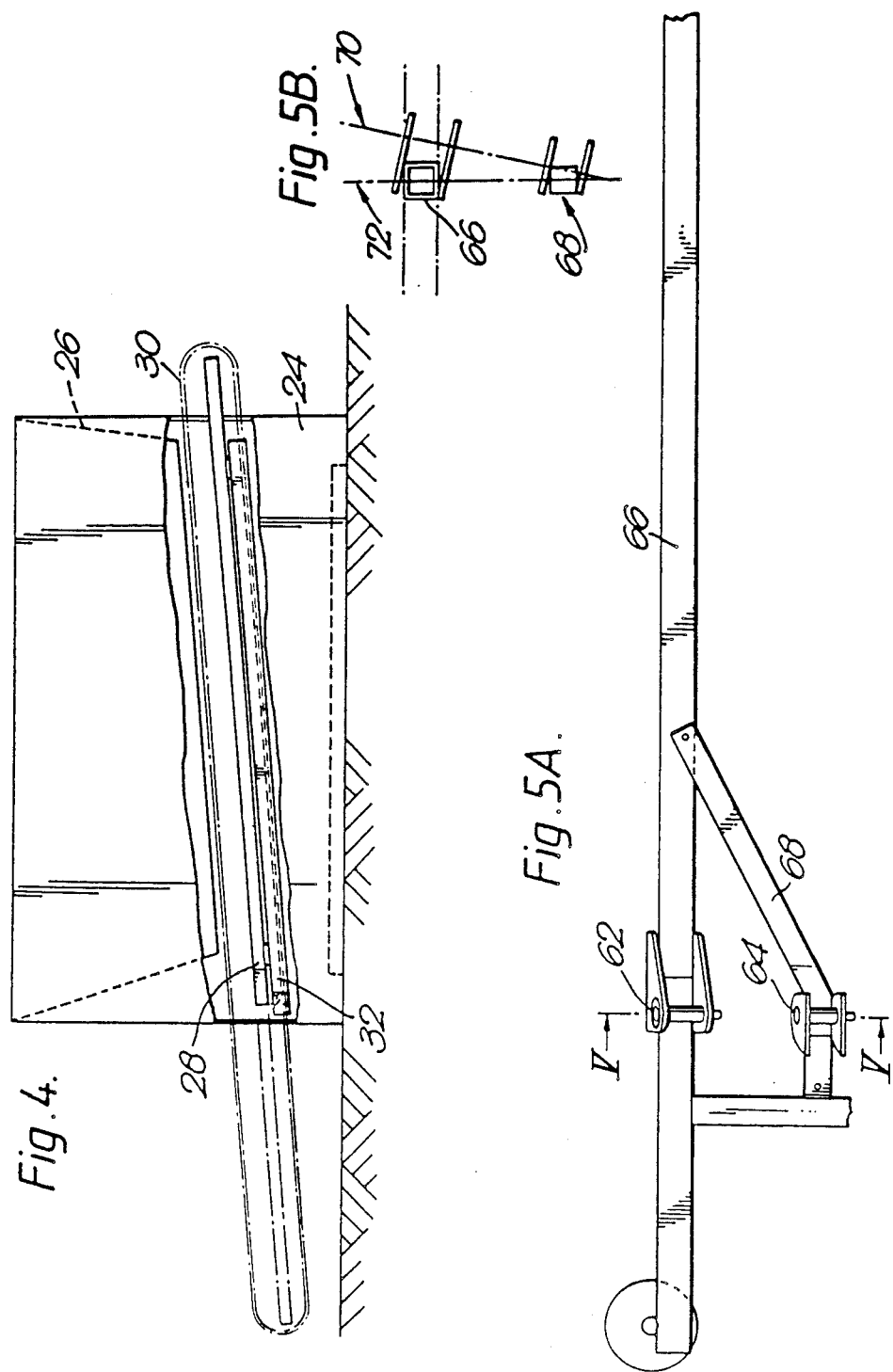

SCREENING APPARATUS

CROSS-REFERENCE TO RELATED APPLICATION

This application is a continuation of application Ser. No. 07/196,773 filed May 17, 1988, now abandoned, which is a continuation of application Ser. No. 07/073,849 filed July 14, 1987, now abandoned, which is a continuation of application Ser. No. 06/842,274 filed Dec. 16, 1985, now abandoned.

This invention relates to screening apparatus for size-classifying discrete material. Such apparatus has heretofore comprised an elevator having an elongate support structure with an endless belt arranged around two rollers longitudinally spaced apart on said structure, the upper flight of said belt being adapted to have a concave attitude at least over the majority of its length and being intended to convey material from a lower or feed end to an upper or discharge end whereat the conveyed material falls under the gravity into an inclined screen box having one or more reticulated and/or non-reticulated wire screen decks. The screen box is normally pivotally mounted to the support structure under the discharge end of the elevator and inclined downwardly away from said discharge end but can be pivotally mounted to an extension of the support structure beyond the discharge end of the elevator and inclined downwardly in the general direction of the feed end of the structure. A boom elevator separate from or secured to the structure can be provided under the screen box to convey away material passing through the or the lowest screen deck in said screen box.

In accordance with the present invention, screening apparatus comprises an elevator having an elongate support with an endless belt arranged around two rollers longitudinally spaced apart on said support, a structure to carry said support in an inclined position, a screen box, rectangular in plan, pivotally linked at or adjacent to one end to the or near to the discharge end of said support and hinged to said structure at or adjacent to an opposite end, the support being movable lengthwise of itself relative to said structure and means being provided to effect such movement whereby lengthwise movement of said support causes pivotal movement of said screen box.

Preferably, said screen box has means to adjust its angle of inclination relative to said support with consequential movement in inclination of said support. The means to move the support and the means to adjust the screen box are preferably hydraulic ram and cylinders in circuit with a hydraulic supply and pump, and controls are provided to separately operate extension and retraction of said rams in said cylinders.

Preferably also, the screen box has two decks which diverge away from each other towards the outlet. An end boom elevator is preferably provided lengthwise beyond the support with its feed end under the screen box to receive size-graded material passing through the lower of the decks. The end boom elevator is preferably in hinged sections to enable it to be foldable.

Preferably further, two lateral boom elevators are provided each to receive one of the grades of material flowing down the decks, the lateral boom elevators extending laterally outwards in opposite directions from the elevator and support. The lateral boom elevators are similarly mounted to be rotatable such that in an out-of-use position they can be positioned flanking both sides of said support and inclined in the opposite direction thereto. Means for mounting the lateral boom elevators are preferably provided and are of such construction that belt tension will not be altered and hydraulic connections do not require to be disconnected between movement of the boom elevators to and from an in-use position and from and to an out-of-use position.

The structure preferably comprises a wheeled trailer having super structure framework to carry the assembly of elevator, screen box, end boom elevator, and two lateral boom elevators. Preferably, a feeder conveyor mounted below a grid is provided to feed material onto the feed end of the elevator, the feeder conveyor and grid also being carried on the trailer.

An embodiment of the present invention will now be described, by way of example, with reference to the accompanying diagrammatic drawings, in which:

FIG. 4 is a side elevational view of a feeder conveyor, to a different scale; and FIGS. 5A and B are respectively a side elevation of a detail of the hinging arrangement for each of two lateral boom elevators, and a section through the line V—V of FIG. 5A.

Figure 1:
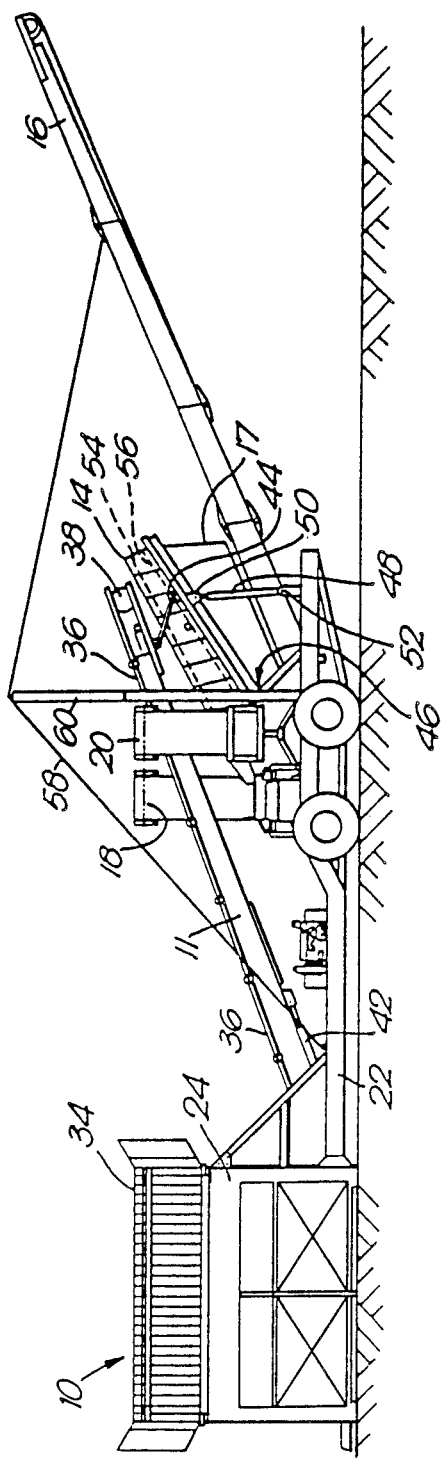
FIG. 1 is a side elevational view showing a screening apparatus according to the present invention with lateral boom elevators and an end boom elevator in in-use positions.

Referring to FIG. 1 of the drawings, screening apparatus comprises a feeder conveyor 10, an elevator 12, a screen box 14, an end boom elevator 16, and two lateral boom elevators 18, 20 all carried on a wheeled trailer 22, a tow bar for which is located at the feeder conveyor end.

The feeder conveyor 10, as shown in FIG. 4 comprises a hopper support 24 in which is provided a hopper 26 having an elongate outlet under which the conveyor is mounted having an elongate frame 28 carrying two spaced rollers about which an endless conveyor belt 30 is arranged. The frame 28 has side rails 32 on which the frame 28 rests. The rails 32 are inclined as shown to allow the frame 28 to be readily moved for cleaning purposes and servicing as shown in dotted formation. The frame 28 is locked in an in-use position by locking pins or the like. An inclined reject grid 34 is mounted above the hopper inlet.

The elevator 12 has an elongate support 11 with an endless belt 36 entrained around two rollers 38 spaced longitudinally on said support. The support is movable lengthwise of itself relative to a structure comprising the wheeled trailer 22 and a super structure framework. The support 11 is carried by inclined rails on said framework adjacent to its loading end, the rails at the feeder conveyor end being curved downwardly to allow for inclination adjustment of the support as referred to hereinafter. The support 11 has means to effect lengthwise movement thereof relative to the framework comprising a hydraulic ram and cylinder 42, the ram being mounted on a pivotal bar on the framework and the ram being secured to the support 11. At the upper end thereof, the support 11 is pivotally linked to the screen box 14 as shown by lateral link 44, one on each side of the box 14. The screen box 14 is hinged at 46 to the framework. Means to adjust the inclination of the screen box 14 comprises two synchronised hydraulic rams and cylinders 48, one on each side of the box, the rams being pivotally secured to a pivot mounting 50 on the box 14 and the cylinders being pivotally mounted at 52 to the framework. Extension or retraction of the ram and cylinder 42 moves the support 11 causing consequential hinging movement of the screen box relative to hinge point 46. Extension and retraction movement of rams and cylinders 48 causes consequential inclination movement of the support 11. The screen box 14 which is rectangular in plan has two screen decks 54, 56 which diverge from each other as shown towards the outlet end; material passing into the box 14 from the discharge end of the elevator 12 being size-classified into three grades, one each passing down the decks 54 and 56 and one passing through the deck 56. The hydraulic rams and cylinders 42, 48 are in circuit with a hydraulic fluid supply and pump and controls are separately provided on a console to operate the extension and retraction of ram 42 and rams 48.

Figure 3:
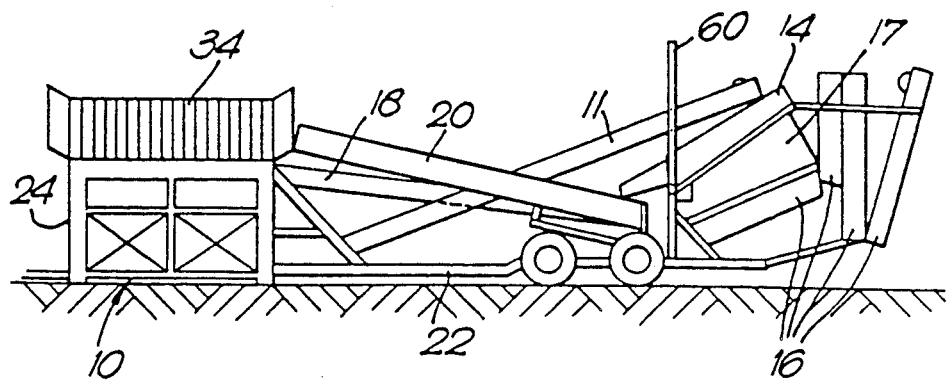
FIG. 3 is a side elevational view to a smaller scale of the apparatus with the lateral boom elevators and end boom elevator in out-of-use positions.

The end boom elevator 16 is provided lengthwise beyond the support and its loading end is located under the deck 56 to receive through a hopper 17 the material passed therethrough. The boom elevator is, as shown in FIGS. 1 and 3 in four sections. In an extended positon, the end boom elevator 16 is supported by two wire ropes 58 as shown anchored to the trailer 22 and passing over support arms 60.

Figure 2:
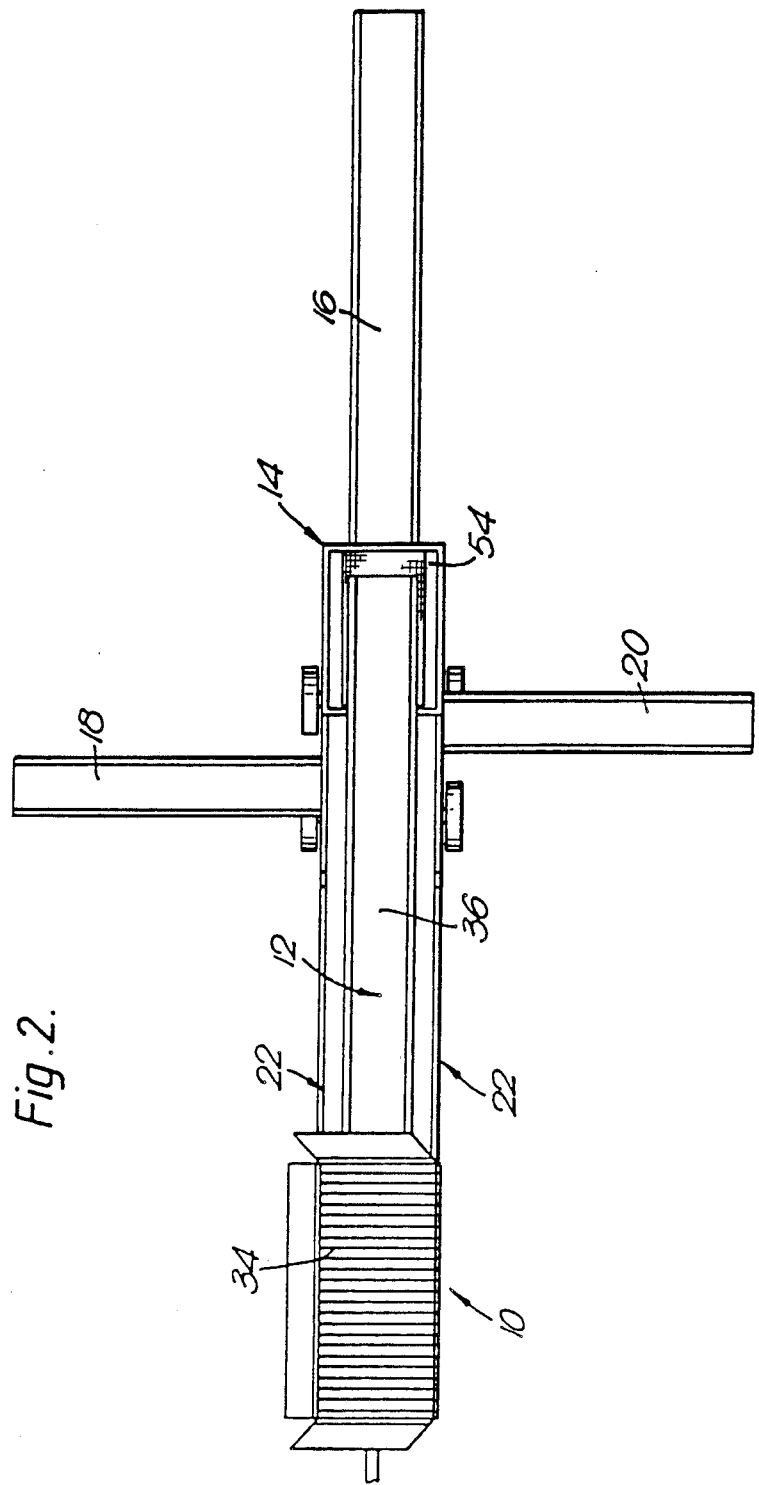
FIG. 2 is a plan view of the apparatus.

Two lateral boom elevators 18, 20 are provided to extend outwardly in opposite directions, in-use, as shown in FIGS. 1 and 2, and to be pivotal on pivots as shown in FIGS. 5A and 5B to allow them to be swung from an in-use extended position into a out-of-use transport position as shown in FIG. 3. The boom elevators are arranged each to receive one grade of material from deck 54 or 56.

The boom elevators 16, 18 and 20 each have a support on which two spaced rollers are mounted around which an endless belt is arranged.

The hinging of the lateral boom elevators 18, 20 is arranged by two hinge points 62, 64 where the top hinge 62 is between the ends of the support 66 adjacent to the lower end thereof and in an angle which enables the support 66 to move below the vertical plane. The second and bottom hinge 64 in same angle as the top hinge 62 is provided to increase the moment of inertia in the hinge axis due to the shape of a stabilizer stay 68. The reason for the angle is because each lateral boom elevator is in an in-use stockpiling position in 24° working angle and in an out-of-use transport position of only 10°–12°.

To achieve a self-adjusting effect on the conveyor belt, the hinge axis 70 is as shown relative to a vertical axis 72 of the support. When the support is swivelled to an out-of-use position the belt slackens, therefore it is never necessary to adjust the belt after swivelling outwardly into an extended in-use working position.

I claim:

1. Screening apparatus comprising an elevator having an elongated support with an endless belt arranged around two rollers longitudinally spaced apart on said support; a structure to carry said support in a plurality of inclined positions; a screen box, rectangular in plan, having a support end and a structure end, pivotally linked to the end of said support corresponding to the discharge end of said endless belt at the support end of the screen box and the screen box hinged to said structure at the structure end of the screen box, the support being capable of being extended and retracted along its length relative to said structure; and means to extend and retract the support along its length relative to said structure being provided to effect such movement whereby lengthwise movement of said support causes pivotal movement of said screen box and wherein said screen box has means to adjust its angle of inclination relative to said support with consequential movement in inclination of said support.

2. Screening apparatus as claimed in claim 1, wherein the means to move the support and the means to adjust the screen box are hydraulic ram and cylinders in circuit with a hydraulic supply and pump with controls being provided to separately operate extension and retraction of said rams in said cylinders.

3. The screening apparatus as claimed in claim 2 wherein the screen box has two decks which diverge away form each other.

4. The screening apparatus as claimed in claim 3 wherein an end boom elevator is provide lengthwise beyond the support with its feed end under the screen box to receive size-graded material passing through the lower deck.

5. The screening apparatus as claimed in claim 3, wherein two lateral boom elevators are provided each to receive one of the grades of material flowing down the decks, the lateral boom elevators extending in-use laterally outwards in opposite directions from the elevator and support.

6. Screening apparatus as claimed in claim 2, further comprising an assembly of the elevator, the screen box, an end boom elevator, and two lateral boom elevators and wherein the structure comprises a wheeled trailer having superstructure framework to carry the assembly of the elevator, the screen box, the end boom elevator and the two lateral boom elevators.

7. The screening apparatus as claimed in claim 2, wherein said structure comprises a trailer and further including a feeder conveyor mounted below a grid provided to feed material onto the feed end of the elevator, the feeder conveyor and grid also being carried on the trailer.

8. Screening apparatus as claimed in claim 1, wherein the screen box has an upper deck and a lower deck which diverge away from each other.

9. The screening apparatus as claimed in claim 8 wherein an end boom elevator is provided lengthwise beyond the support with its feed end under the screen box to receive size-graded material passing through the lower of the decks.

10. The screening apparatus as claimed in claim 9, wherein two lateral boom elevators are provided each to receive one of the grades of material flowing down the decks, the lateral boom elevators extending in-use laterally outwards in opposite directions from the elevator and support.

11. The screening apparatus as claimed in claim 8, wherein two lateral boom elevators are provided each to receive one of the grades of material flowing down the decks, the lateral boom elevators extending in-use laterally outwards in opposite directions from the elevator and support.

12. Screening apparatus as claimed in claim 8 further comprising an assembly of the elevator, the screen box, an end boom elevator, and two lateral boom elevators and wherein the structure comprises a wheeled trailer having superstructure framework to carry the assembly of the elevator, the screen box, the end boom elevator and the two lateral boom elevators.

13. Screening apparatus as claimed in claim 1, wherein an end boom elevator is provided lengthwise beyond the support with its feed end under the screen box to receive size-graded material passing therethrough.

14. Screening apparatus as claimed in claim 13, wherein the end boom elevator is in hinged sections to enable it to be foldable.

15. Screening apparatus as claimed in claim 1, wherein two lateral boom elevators are provided each to receive one of the grades of material separated by said screen box, the lateral boom elevators extending in-use laterally outwards in opposite directions from the elevator and support.

16. Screening apparatus as claimed in claim 15, wherein the lateral boom elevators are similarly mounted to be rotatable such that in an out-of-use position they can be positioned flanking both sides of said support and inclined in the opposite direction thereto.

17. The screening apparatus as claimed in claim 16, wherein means for mounting the lateral boom elevators are provided and are of such construction that belt tension will not be altered and hydraulic connections do not require to be disconnected between movement of the boom elevators to and from an in-use position from and to an out-of-use position.

18. Screening apparatus as claimed in claim 15, wherein means for mounting the lateral boom elevators are provided and are of such construction that belt tension will not be altered and hydraulic connections do not require to be disconnected between movement of the boom elevators to and from an in-use position from and to an out-of-use position.

19. Screening apparatus as claimed in claim 1 further comprising an assembly of the elevator, the screen box, an end boom elevator, and two lateral boom elevators, and wherein the structure comprises a wheeled trailer having superstructure framework to carry the assembly of the elevator, the screen box, the end boom elevator, and the two lateral boom elevators.

20. Screening apparatus as claimed in claim 1, wherein said structure comprises a trailer and further including a feeder conveyor mounted below a grid provided to feed material onto the feed end of the elevator, the feeder conveyor and grid also being carried on the trailer.

* * * * *